US011528140B2

(12) United States Patent
Tiffany et al.

(10) Patent No.: US 11,528,140 B2
(45) Date of Patent: Dec. 13, 2022

(54) COMPROMISED ACCESS TOKEN INVALIDATION IN A SINGLETON PROCESS

(71) Applicant: International Business Machines Corporation, Armonk, NY (US)

(72) Inventors: Bruce Tiffany, Austin, TX (US); David Alex Cohen, Poughkeepsie, NY (US); Chunlong Liang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 17/171,157

(22) Filed: Feb. 9, 2021

(65) Prior Publication Data

US 2022/0255745 A1 Aug. 11, 2022

(51) Int. Cl.
*H04L 9/32* (2006.01)
*H04L 9/08* (2006.01)
(Continued)

(52) U.S. Cl.
CPC .......... *H04L 9/3213* (2013.01); *G06F 21/31* (2013.01); *H04L 9/0891* (2013.01);
(Continued)

(58) Field of Classification Search
CPC ... H04L 9/3213; H04L 9/0891; H04L 9/3226; H04L 63/0807; H04L 67/568; G06F 21/31
See application file for complete search history.

(56) References Cited

U.S. PATENT DOCUMENTS 10,367,816 B2 7/2019 Enoki et al.
10,417,210 B2 9/2019 Ko et al.
(Continued)

FOREIGN PATENT DOCUMENTS

CA 30399701 A1 10/2019
CN 109639672 A 4/2019

OTHER PUBLICATIONS

Ethelbert et al., "A JSON Token-Based Authentication And Access Management Schema For Cloud SaaS Applications," 2017 IEEE 5th International Conference on Future Internet of Things and Cloud (FiCloud), Aug. 2017, 6 pages.
(Continued)

*Primary Examiner* — Henry Tsang
(74) *Attorney, Agent, or Firm* — Yee & Associates, P.C.

(57) ABSTRACT

Handling access token invalidation is provided. In response to receiving a valid login from a user requesting access to a service, a new access token is issued to the user with a claim containing a container identifier. A first cache corresponding to access tokens issued to the user is searched. In response to identifying a previously issued access token corresponding to the user in the first cache, the previously issued access token is added to a second cache corresponding to stale tokens. The new access token is added to the first cache. In response to receiving the new access token as an identity of the user to access the service, the new access token is validated when the new access token is not identified in the second cache of stale tokens and the container identifier contained in the claim matches an identifier corresponding to a running container of the service.

20 Claims, 6 Drawing Sheets

(51) Int. Cl.
  *H04L 9/40* (2022.01)
  *G06F 21/31* (2013.01)
  *H04L 67/568* (2022.01)

(52) U.S. Cl.
  CPC ........ *H04L 9/3226* (2013.01); *H04L 63/0807* (2013.01); *H04L 67/568* (2022.05)

(56) References Cited

U.S. PATENT DOCUMENTS

| | | | |
|---|---|---|---|
| 10,664,844 B2 | 5/2020 | Narayan | |
| 10,757,225 B2 | 8/2020 | Burckhardt et al. | |
| 11,044,257 B1* | 6/2021 | Heuts | H04L 63/108 |
| 2017/0041144 A1* | 2/2017 | Krapf | H04L 9/3234 |
| 2018/0330368 A1* | 11/2018 | Slupesky | H04L 67/02 |
| 2019/0007409 A1* | 1/2019 | Totale | H04L 63/102 |
| 2019/0238518 A1 | 8/2019 | Wu et al. | |
| 2019/0327223 A1 | 10/2019 | Kumar et al. | |
| 2019/0340609 A1 | 11/2019 | Mayadas et al. | |
| 2019/0394040 A1* | 12/2019 | Modi | H04L 9/0861 |
| 2019/0394041 A1* | 12/2019 | Jain | H04L 9/0894 |
| 2020/0320178 A1 | 10/2020 | Gallagher | |
| 2020/0412540 A1 | 12/2020 | Sabath et al. | |

OTHER PUBLICATIONS

Hong et al., "A Study On A JWT-Based User Authentication And API Assessment Scheme Using IMEI In A Smart Home Environment," Sustainability 2017, vol. 9, 16 pages.

Janoky et al., "An Analysis On The Revoking Mechanisms For JSON Web Tokens," International Journal of Distributed Sensor Networks, vol. 14, Aug. 2018, 10 pages.

Grace Period Disclosure, Bruce Tiffany, David Cohen, and Chunlong Liang, "Release 0.7.0", Github, kabanero-io/kabanero-command-line-services, Mar. 20, 2020, accessed Jan. 14, 2021, 1 page. https://github.com/kabanero-io/kabanero-command-line-services/releases/tag/0.7.0.

Miahindrakar et al., "Insights Of JSON Web Token," International Journal of Recent Technology and Engineering (IJRTE), vol. 8, Issue-6, Mar. 2020, 4 pages.

Shingala, "JSON Web Token (JWT) Based Client Authentication In Message Queuing Telemetry Transport (MQTT)," arXiv:1903.02895v1, Mar. 2019, 19 pages.

* cited by examiner

COMPROMISED ACCESS TOKEN INVALIDATION IN A SINGLETON PROCESS

STATEMENT REGARDING PRIOR DISCLOSURES BY THE INVENTOR OR A JOINT INVENTOR

The following disclosure is submitted under 35 U.S.C. § 102(b)(1)(A): "kabanero-io/kabanero-command-line-services, Release 0.7.0," Bruce Tiffany, David Cohen, and Chunlong Liang, Mar. 20, 2020 made publicly available, 1 page.

BACKGROUND

1. Field

The disclosure relates generally to identity and access management in a Kubernetes environment and more specifically to invalidating an access token presented by a user to access a requested service based on at least one of the presented access token being a stale, previously issued access token and the presented access token does not contain a correct unique container identifier corresponding to a current, running Kubernetes container instance of the requested service in a Kubernetes environment.

2. Description of the Related Art

Identity and access management (IAM) is a framework of processes, policies, and technologies that facilitates the management of digital identities. An IAM framework can control user access to protected resources (e.g., data, documents, files, software, hardware, services, and the like) corresponding to an entity, such as, for example, an enterprise, business, company, organization, institution, agency, or the like. IAM systems can be deployed on premises, provided by a third-party vendor through a cloud-based subscription model, or deployed in a hybrid model. Typical systems used for IAM include single sign-on systems, two-factor authentication, multifactor authentication, privileged access management, and token-based authorization.

Token-based authorization (e.g., OAuth 2.0) is a protocol which allows users to verify their identity and in return receive a unique access token. During the lifetime of the access token, a user can access a corresponding protected resource, such as a cloud service, which the access token has been issued for. First, the user requests access to the protected resource. That may involve a login with credentials, such as, for example, username and password. The authorization server determines whether the user should have access by, for example, comparing the received credentials with stored credentials corresponding to the user. After credential authentication or validation, the authorization server issues the access token to the user. The authorization server signs the access token using either a private secret or a public/private key.

Kubernetes is an open-source container-orchestration environment for automating computer application deployment, scaling, and management. Kubernetes provides a platform for automating deployment, scaling, and operations of application containers across clusters of hosts. Kubernetes works with a range of container tools and runs containers in a cluster, often with images built using Docker. Many cloud services offer a Kubernetes-based platform or infrastructure as a service (e.g., Platform-as-a-Service, Infrastructure-as-a-Service, or the like) on which Kubernetes can be deployed as a platform-providing service.

The Kubernetes environment includes a controller node and worker nodes. The controller node is a main controlling unit of a cluster, managing the cluster's workload and directing communication across the environment. A worker node is a machine where containers (i.e., application workloads) are deployed. The worker node hosts the pods that are the components of an application workload. A pod consists of one or more containers that are co-located on the same worker node.

SUMMARY

According to one illustrative embodiment, a computer-implemented method for handling access token invalidation in a singleton process is provided. In response to receiving a valid login from a user requesting access to a service, a new access token is issued to the user with an attached claim containing a unique container identifier. A first cache of key-value pairs corresponding to access tokens issued to the user is searched. In response to identifying a previously issued access token corresponding to the user in the first cache, the previously issued access token is added to a second cache of key-value pairs corresponding to stale tokens. The new access token is added to the first cache corresponding to issued access tokens. In response to receiving the new access token as an identity of the user to access the service, the new access token is validated when the new access token is not identified in the second cache of key-value pairs corresponding to stale tokens and the unique container identifier contained in the attached claim matches a cached identifier corresponding to a current, running container of the service. According to other illustrative embodiments, a computer system and computer program product for handling access token invalidation in a singleton process are provided.

DETAILED DESCRIPTION

Figure 1:
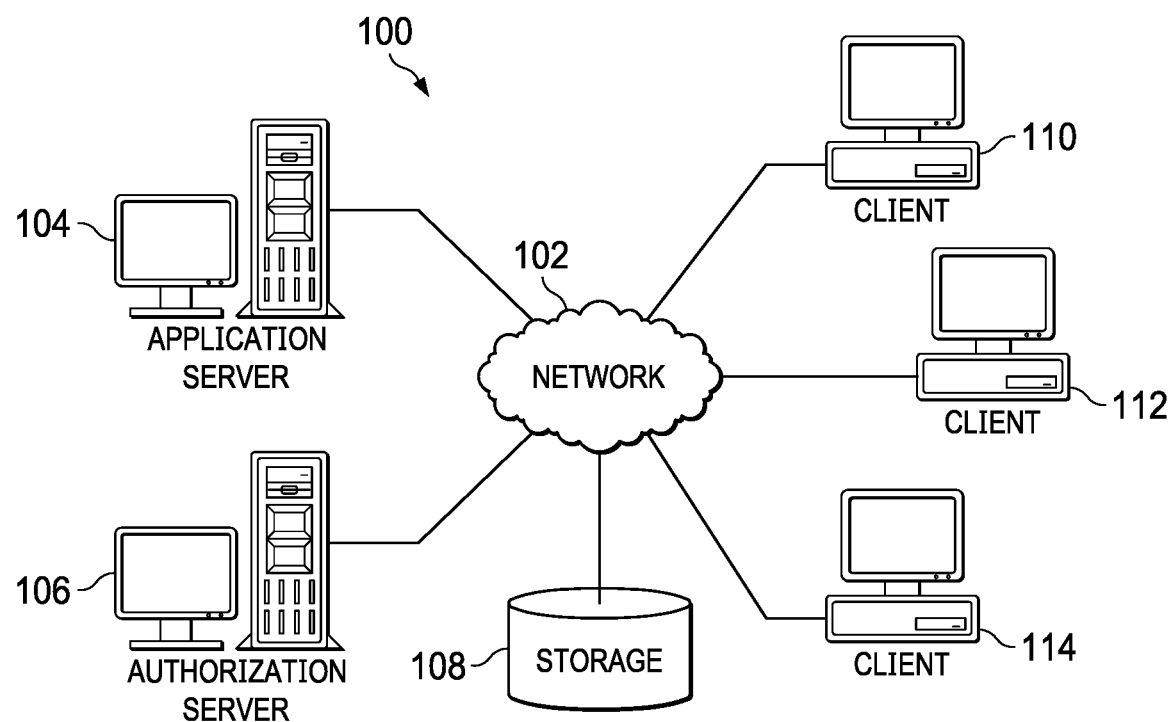
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
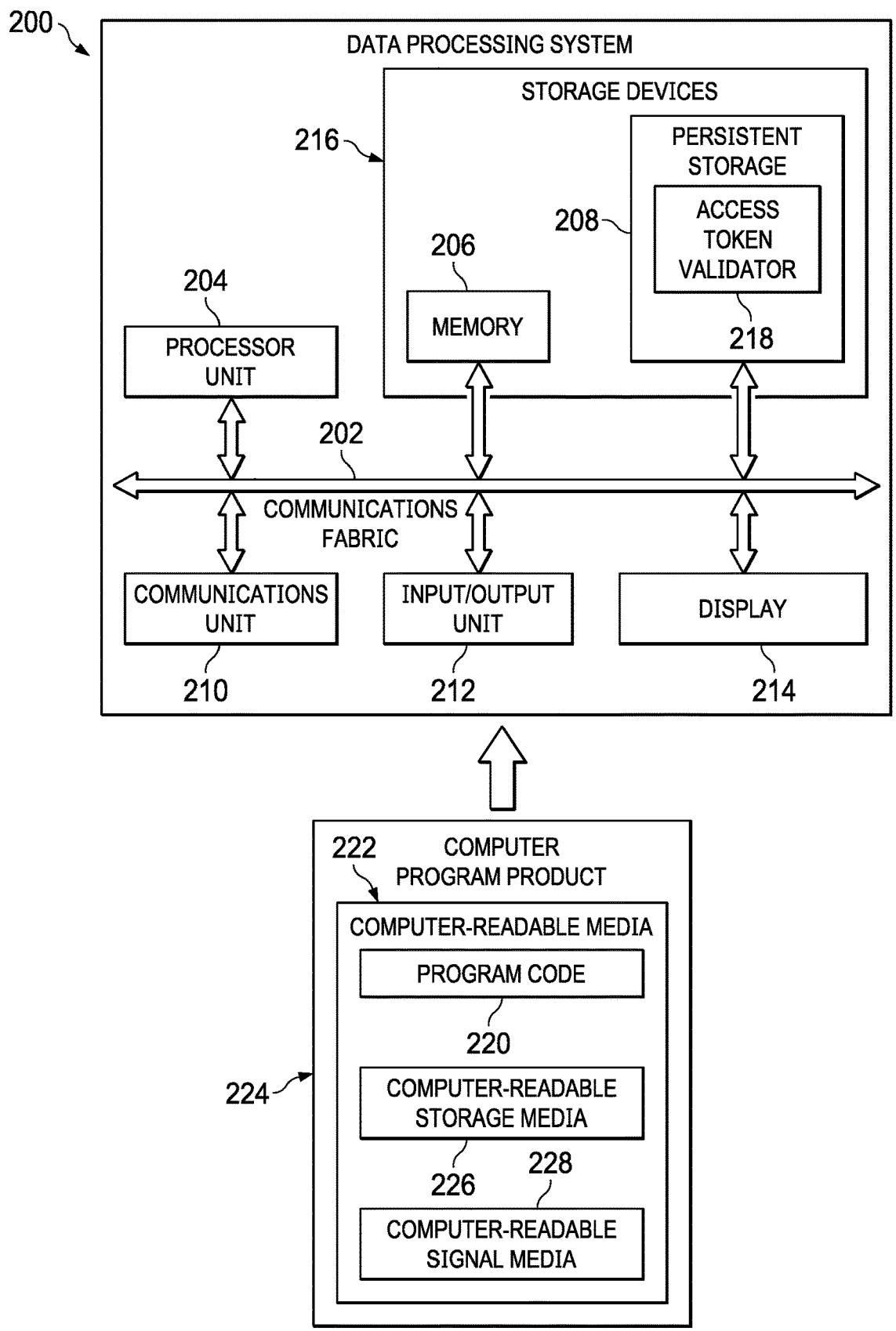
FIG. 2 is a diagram of a data processing system in which illustrative embodiments may be implemented.
Figure 3:
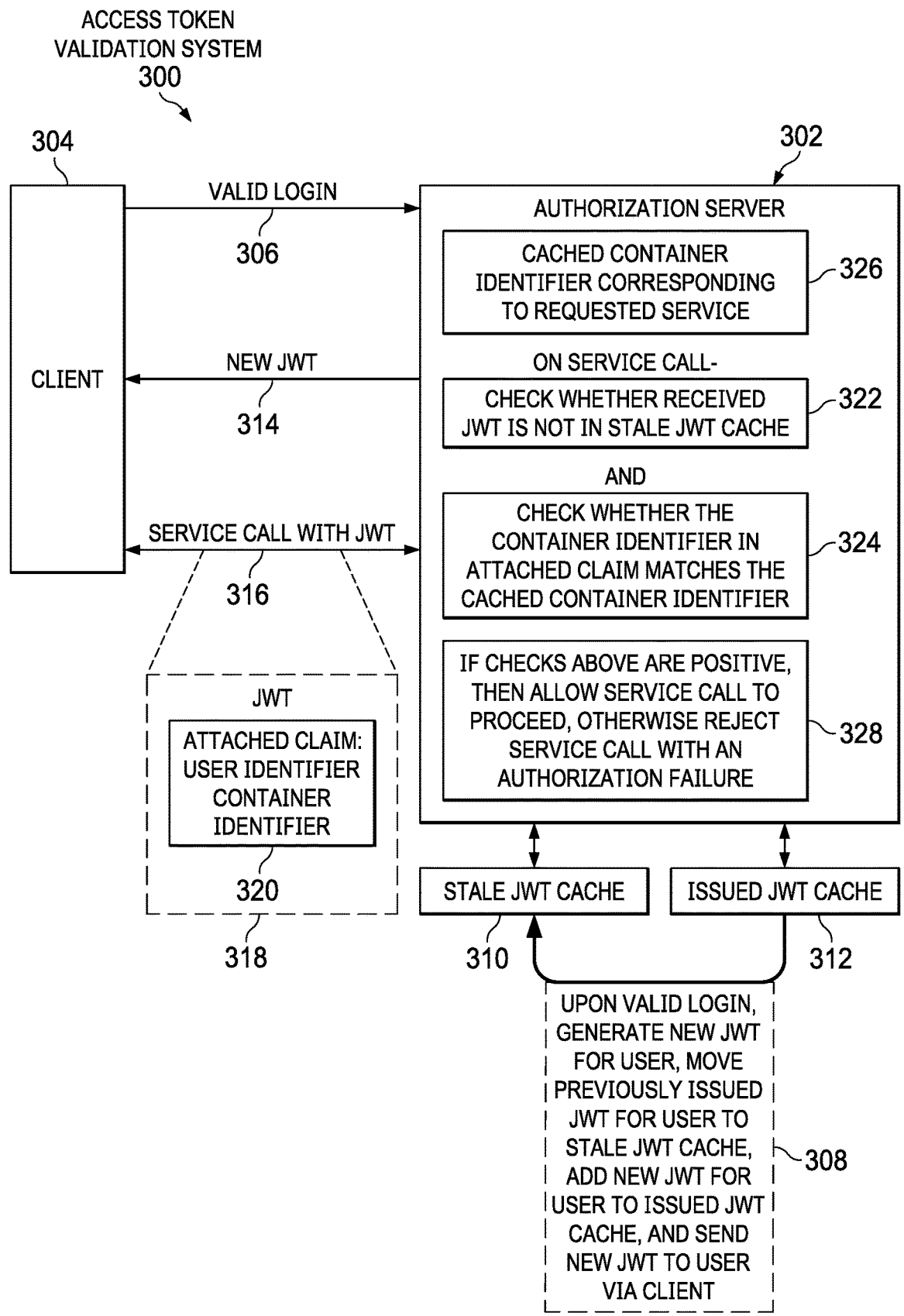
FIG. 3 is a diagram illustrating an example of an access token validation system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, application server 104 and authorization server 106 connect to network 102, along with storage 108. Application server 104 and authorization server 106 may be, for example, server computers with high-speed connections to network 102. In addition, application server 104 and authorization server 106 may each represent a cluster of servers in one or more data centers. Alternatively, application server 104 and authorization server 106 may each represent multiple computing nodes in one or more cloud environments. Further, in an alternative illustrative embodiment, application server 104 and authorization server 106 may be combined in one server computer. Furthermore, application server 104 and authorization server 106 may be included in a Kubernetes environment.

Application server 104 hosts a set of applications. The set of applications may be operated by an entity, such as, for example, an enterprise, business, company, organization, institution, agency, or the like. In addition, the set of applications may represent any types of applications. For example, the set of applications may perform one or more services, such as banking services, financial services, educational services, healthcare services, insurance services, informational services, data processing services, transactional services, and the like, to clients.

Client 110, client 112, and client 114 also connect to network 102. Clients 110, 112, and 114 are clients of application server 104. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart glasses, smart televisions, smart vehicles, smart appliances, gaming devices, kiosks, and the like, with wire or wireless communication links to network 102. Users of clients 110, 112, and 114 may utilize clients 110, 112, and 114 to access and utilize the services provided by the set of applications hosted on application server 104.

Authorization server 106 controls access by clients using access tokens to the services provided by the set of applications hosted on application server 104. For example, authorization server 106 invalidates compromised access tokens and returns an authorization failure by performing two access token checks in a singleton process. Specifically, authorization server 106 invalidates a presented access token to access a requested service based on either the presented access token being a previously issued access token or the presented access token does not contain a correct container identifier corresponding to a current, running Kubernetes container instance of the requested service.

Storage 108 is a network storage device capable of storing any type of data in a structured format or an unstructured format. In addition, storage 108 may represent a plurality of network storage devices. Further, storage 108 may store identifiers and network addresses for a plurality of client devices, identifiers for a plurality of client device users, and the like. Furthermore, storage 108 may store other types of data, such as, for example, authentication or credential data that may include usernames, passwords, and biometric data associated with client device users.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on application server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as authorization server 106 in FIG. 1, in which computer-readable program code or instructions implementing the compromised access token invalidation processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores access token validator 218. However, it should be noted that even though access token validator 218 is illustrated as residing in persistent storage 208, in an alternative illustrative embodiment, access token validator 218 may be a separate component of data processing system 200. For example, access token validator 218 may be a hardware component coupled to communication fabric 202 or a combination of hardware and software components.

Access token validator 218 controls the process of validating a access token presented by a user via a client device to access a requested service hosted by an application server, such as, for example, application server 104 in FIG. 1, based on the presented access token being a new access token corresponding to the user and the presented access token contains a correct unique container identifier corresponding to a current, running Kubernetes container instance of the requested service in a Kubernetes environment. Access token validator 218 tracks previously issued access tokens (e.g., JSON Web Tokens) and caches in a cache of memory 206 a unique container identifier corresponding to a current, running Kubernetes container instance of the requested service.

A JSON Web Token is an Internet standard for creating data with optional signature and/or optional encryption whose payload holds JavaScript Object Notation (JSON) that asserts one or more claims. JavaScript Object Notation is an open standard file format and data interchange format that uses human-readable text to store and transmit data objects. A claim is a statement regarding, for example, a user. Claims-based identity is a way for applications to acquire identity information regarding a user.

When a user logs in, access token validator 218 issues a new JSON Web Token to the user after authentication. Access token validator 218 also attaches a claim, which contains the correct unique container identifier corresponding to the current, running Kubernetes container instance of the requested service, to the new JSON Web Token. In addition, access token validator 218 scans an issued JSON Web Token cache (e.g., an in-memory cache) containing key-value pairs of user identifiers to issued JSON Web Tokens. If access token validator 218 determines that an issued JSON Web Token corresponding to the user is included in the issued JSON Web Token cache, then access token validator 218 invalidates the issued JSON Web Token by adding the issued JSON Web Token to a cache of stale JSON Web Tokens. Access token validator 218 then adds the new JSON Web Token to the issued JSON Web Token cache for any future user login scans.

Once access token validator 218 establishes a JSON Web Token for a current login session, access token validator 218 performs two checks in a singleton process on any JSON Web Token passed in as a user identity on a thread when calling a service endpoint. The two checks performed by access token validator 218 on any JSON Web Token are: 1) that the received JSON Web Token is not listed in the stale JSON Web Token cache; and 2) that the unique container identifier contained in the claim attached to the presented JSON Web Token matches a cached unique identifier of the current, running Kubernetes container instance of the called or requested service.

Access token validator 218 may utilize a pre-processor implementation (e.g., a Container Request Filter implementation) to perform the two checks on received JSON Web Tokens mentioned above. A Container Request Filter implementation uses two private member functions to check whether a given JSON Web Token should be accepted or rejected. The first filter function checks whether the JSON Web Token was validated (i.e., the JSON Web Token was not previously added to the cache of stale JSON Web Tokens). The second filter function checks whether the claim attached to the JSON Web Token contains a unique identifier corresponding to the current, running Kubernetes container instance that matches a cached container identifier for the current, running Kubernetes container instance for the requested service. If the JSON Web Token passes both checks, then access token validator 218 allows the service endpoint call to continue. Otherwise, access token validator 218 determines that the JSON Web Token is compromised and rejects the service endpoint call with an authorization failure when the JSON Web Token does not pass one of the two checks.

As a result, data processing system 200 operates as a special purpose computer system in which access token validator 218 in data processing system 200 enables invalidation of compromised access tokens. In particular, access token validator 218 transforms data processing system 200 into a special purpose computer system as compared to currently available general computer systems that do not have access token validator 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

In the course of developing illustrative embodiments, it was discovered that two areas of vulnerability existed in current authorization solutions. The two areas of vulnerability are: 1) that multiple logins using stale access tokens were still gaining access to service instances; and 2) that caches used to track stale tokens were lost when an authorization server instance was recycled. Current authorization solutions use time ranges to determine whether access tokens are still valid or not. Illustrative embodiments utilize a unique identifier to associate an access token to a current, running Kubernetes container instance of a service. Additionally, illustrative embodiments immediately discard access tokens corresponding to users as soon as the authorization server issues new access tokens to the users.

Illustrative embodiments utilize, for example, JSON Web Tokens, as the access tokens for authorizing access to protected resources, such as, for example, cloud services. A JSON Web Token is an open standard (i.e., RFC 7519) that defines a compact, self-contained technique to securely transmit information as a JSON object between entities. Illustrative embodiments ensure that the JSON Web Token of the client call to a service, such as, for example, a microservice, hosted by an application server, for example, is both current and corresponds to a running Kubernetes container instance of the called service in a Kubernetes environment. Illustrative embodiments reject any JSON Web Token that is older than the current login session and does not correspond to the current Kubernetes container instance of the called service.

To address the first area of vulnerability with current authorization solutions mentioned above, illustrative embodiments invalidate all previously issued JSON Web Tokens corresponding to a user to access a requested service before issuing a new JSON Web Token upon valid login (i.e., authentication) of the user. Illustrative embodiments utilize a bounded cache to track all previously issued JSON Web Tokens corresponding to the user to prevent an unauthorized user's attempt to reuse any of the previously issued JSON Web Tokens to access the service. As a result, whenever illustrative embodiments receive a previously issued JSON Web Token to access a service, illustrative embodiments issue an authorization failure.

Regarding the second area of vulnerability with current authorization solutions mentioned above, when a Kubernetes container instance where the service was running is recycled, the bounded cache tracking the previously issued (i.e., invalid) JSON Web Tokens is lost and, as a result, there is no way to track these stale JSON Web Tokens after container recycling. Illustrative embodiments utilize a unique container identifier in an attached claim to each JSON Web Token so that every JSON Web Token issued for the life of a Kubernetes container instance of a service would have a unique container identifier, which corresponds to the currently running Kubernetes container instance of the service. Therefore, illustrative embodiments validate any JSON Web Token flowing on a thread for a service endpoint call by ensuring a given JSON Web Token corresponds to the currently running Kubernetes container instance of the called or requested service.

Using these two JSON Web Token checks above, illustrative embodiments are capable of invalidating compromised JSON Web Tokens, as is possible with opaque access tokens, while avoiding the need for a persistent datastore, which is typically needed for tracking opaque access tokens. Thus, illustrative embodiments are capable of invalidating compromised JSON Web Tokens in a singleton process. Consequently, illustrative embodiments are preferable to current authorization solutions because instead of using a time range to determine whether an access token is valid or not, illustrative embodiments utilize a unique container identifier that corresponds to the current, running Kubernetes container instance of the requested service, which provides increased security. Additionally, illustrative embodiments invalidate all previously issued access tokens corresponding to an authorized user when a new access token issued to that user.

Thus, illustrative embodiments provide one or more technical solutions that overcome a technical problem with determining when access tokens are compromised. As a result, these one or more technical solutions provide a technical effect and practical application in the field of identity and access management.

With reference now to FIG. 3, a diagram illustrating an example of an access token validation system is depicted in accordance with an illustrative embodiment. Access token validation system 300 may be implemented in a network of data processing systems, such as network data processing system 100 in FIG. 1. Access token validation system 300 is a system of hardware and software components for validating access tokens, such as, for example, JSON Web Tokens, presented by users via client devices to access services hosted by one or more application servers based on the access tokens being new access tokens corresponding to the users and the access tokens contain correct container identifiers corresponding to current, running Kubernetes container instances of requested services.

In this example, access token validation system 300 includes authorization server 302 and client 304. Authorization server 302 may be, for example, authorization server 106 in FIG. 1 or data processing system 200 in FIG. 2. Client 304 may be, for example, client 110 in FIG. 1. However, it should be noted that access token validation system 300 is intended as an example only and not as a limitation on illustrative embodiments. In other words, access token validation system 300 may include any number of authorization servers, clients, and other devices not shown.

At 306, a user of client 304 provides a valid login to authorization server 302 requesting access to a service hosted by an application server, such as, for example, application server 104 in FIG. 1. At 308, upon receiving the valid login from the user of client 304, authorization server 302 generates a new JSON Web Token (JWT) for the user, moves the previously issued JWT for the user to stale JWT cache 310, adds the new JWT for the user to issued JWT cache 312, and sends the new JWT to the user via client 304 at 314.

At 316, the user of client 304 sends a service call with JWT 318. JWT 318 includes attached claim 320. Attached claim 320 includes a user identifier corresponding to the user of client 304 and a container identifier corresponding to the current, running Kubernetes container instance of the called service.

At 322, authorization server 302, upon receiving the service call, checks whether received JWT 318 included with the service call is not in stale JWT cache 310. Further, at 324, authorization server 302 checks whether the container identifier in attached claim 320 matches cached container identifier 326 corresponding to the called service.

At 328, if authorization server 302 determines that the two checks above (i.e., 322 and 324) are positive, then authorization server 302 allows the service call. Otherwise, if authorization server 302 determines that either of the two checks above are negative, then authorization server 302 determines that JWT 318 is compromised and rejects the service call with an authorization failure.

Figure 4:
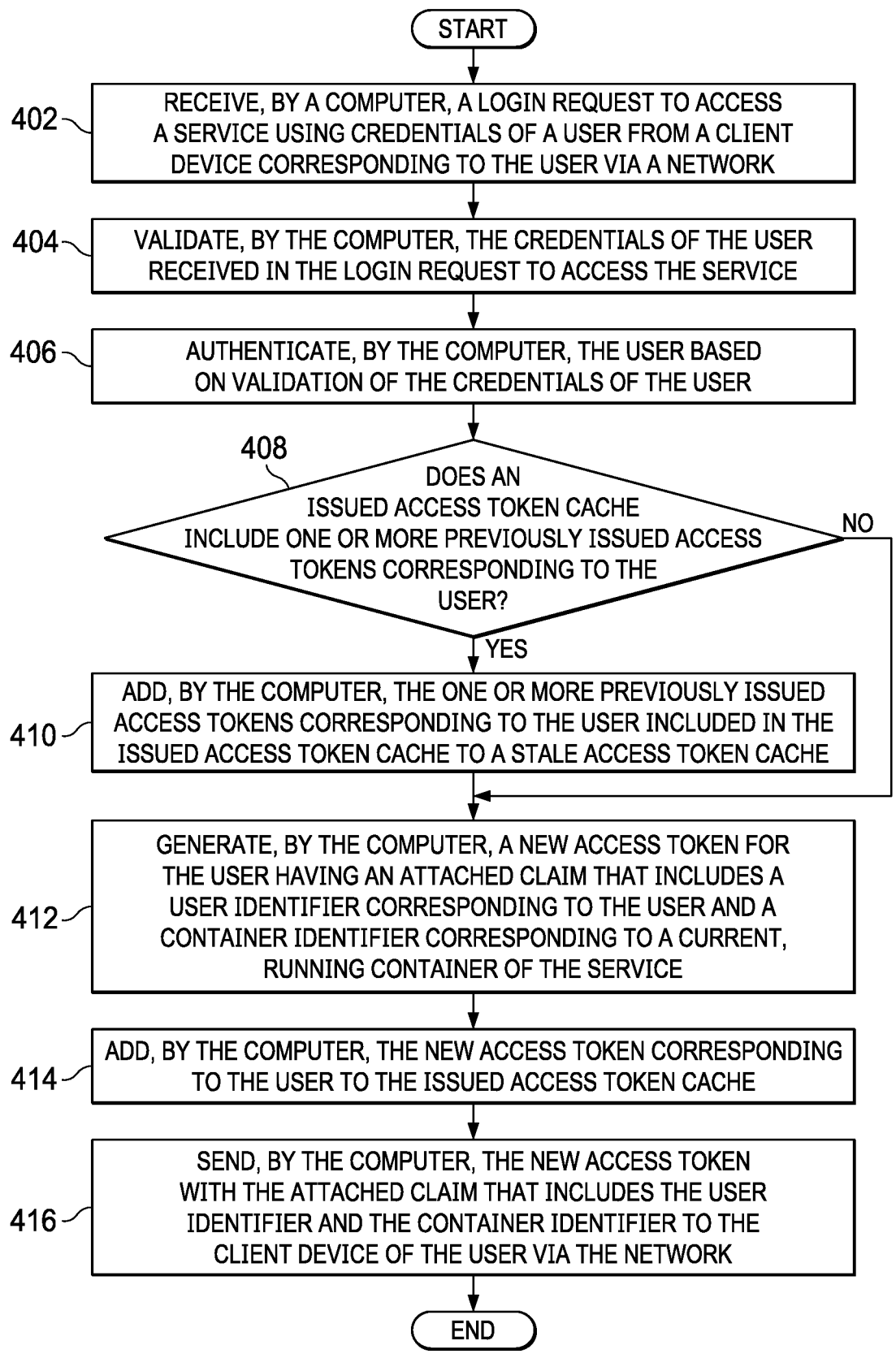
FIG. 4 is a flowchart illustrating a process for issuing a new access token to a user in accordance with an illustrative embodiment.

With reference now to FIG. 4, a flowchart illustrating a process for issuing a new access token to a user is shown in accordance with an illustrative embodiment. The process shown in FIG. 4 may be implemented in a computer, such as, for example, authorization server 106 in FIG. 1 or data processing system 200 in FIG. 2. For example, the process shown in FIG. 4 may be implemented in access token validator 218 in FIG. 2.

The process begins when the computer receives a login request to access a service using credentials of a user from a client device corresponding to the user via a network (step 402). The computer validates the credentials of the user received in the login request to access the service (step 404). The computer authenticates the user based on validation of the credentials of the user (step 406).

The computer makes a determination as to whether an issued access token cache includes one or more previously issued access tokens corresponding to the user (step 408). If the computer determines that the issued access token cache does not include one or more previously issued access tokens corresponding to the user, no output of step 408, then the process proceeds to step 412. If the computer determines that the issued access token cache does include one or more previously issued access tokens corresponding to the user, yes output of step 408, then the computer adds the one or more previously issued access tokens corresponding to the user included in the issued access token cache to a stale access token cache (step 410).

The computer generates a new access token for the user having an attached claim that includes a user identifier corresponding to the user and a container identifier corresponding to a current, running container of the service (step 412). In addition, the computer adds the new access token corresponding to the user to the issued access token cache (step 414). Further, the computer sends the new access token with the attached claim that includes the user identifier and the container identifier to the client device of the user via the network (step 416). Thereafter, the process terminates.

Figure 5:
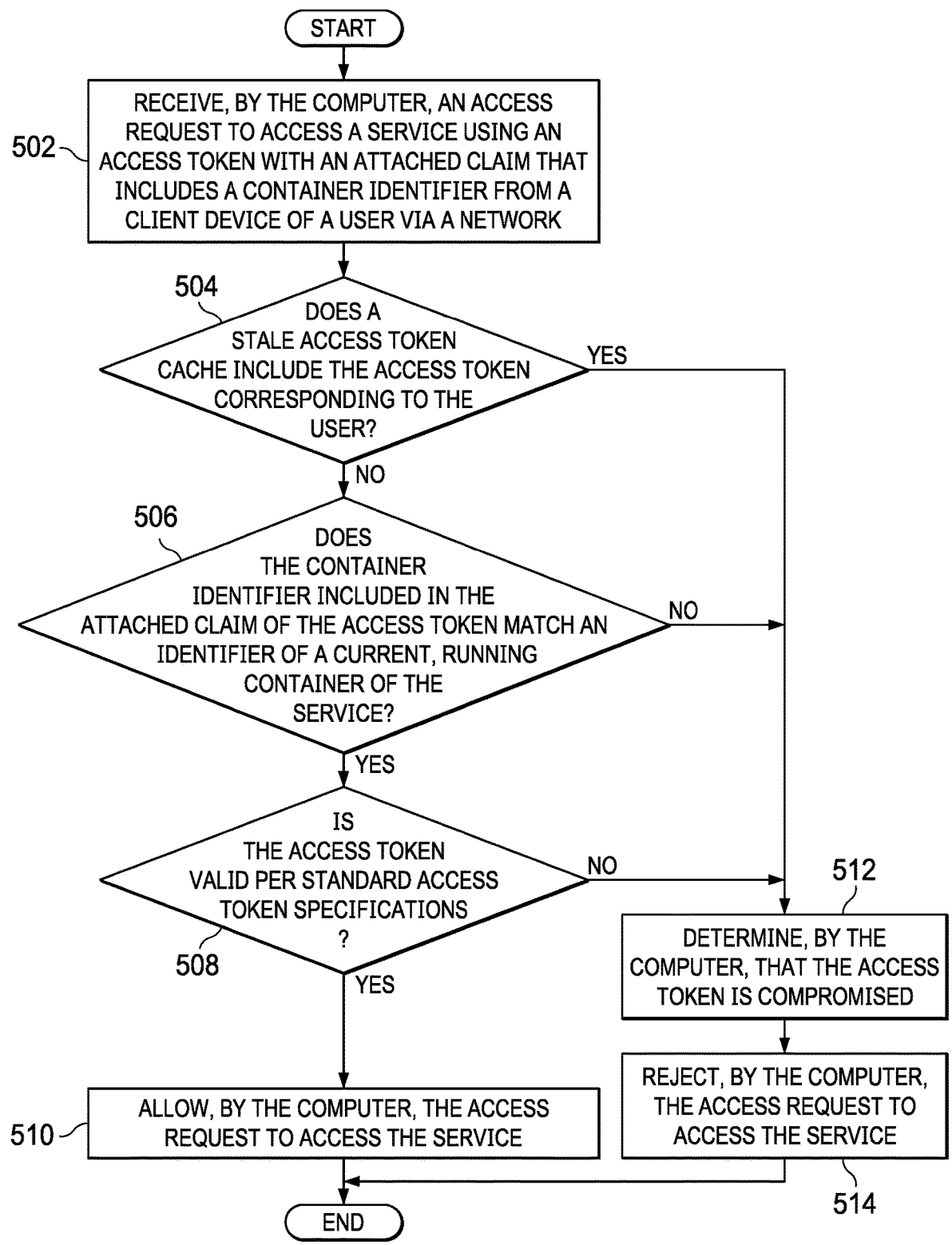
FIG. 5 is a flowchart illustrating a process for invalidating compromised access tokens in a singleton process in accordance with an illustrative embodiment.

With reference now to FIG. 5, a flowchart illustrating a process for invalidating compromised access tokens in a singleton process is depicted in accordance with an illustrative embodiment. The process shown in FIG. 5 may be implemented in a computer, such as, for example, authorization server 106 in FIG. 1 or data processing system 200 in FIG. 2. For example, the process shown in FIG. 5 may be implemented in access token validator 218 in FIG. 2.

The process begins when the computer receives an access request to access a service using an access token with an attached claim that includes a container identifier from a client device of a user via a network (step 502). The computer makes a determination as to whether a stale access token cache includes the access token corresponding to the user (step 504).

If the computer determines that the stale access token cache does include the access token corresponding to the user, yes output of step 504, then the process proceeds to step 512. If the computer determines that the stale access token cache does not include the access token corresponding to the user, no output of step 504, then the computer makes a determination as to whether the container identifier included in the attached claim of the access token matches an identifier of a current, running container of the service (step 506).

If the computer determines that the container identifier included in the attached claim of the access token does not match the identifier of the current, running container of the service, no output of step 506, then the process proceeds to step 512. If the computer determines that the container identifier included in the attached claim of the access token does match the identifier of the current, running container of the service, yes output of step 506, then the computer makes a determination as to whether the access token is valid per standard access token specifications (step 508).

If the computer determines that the access token is valid per standard access token specifications, yes output of step 508, then the computer allows the access request to access the service (step 510) and the process terminates thereafter. If the computer determines that the access token is invalid per standard access token specifications, no output of step 508, then the computer determines that the access token is compromised (step 512). In addition, the computer rejects the access request to access the service (step 514). Thereafter, the process terminates.

Figure 6:
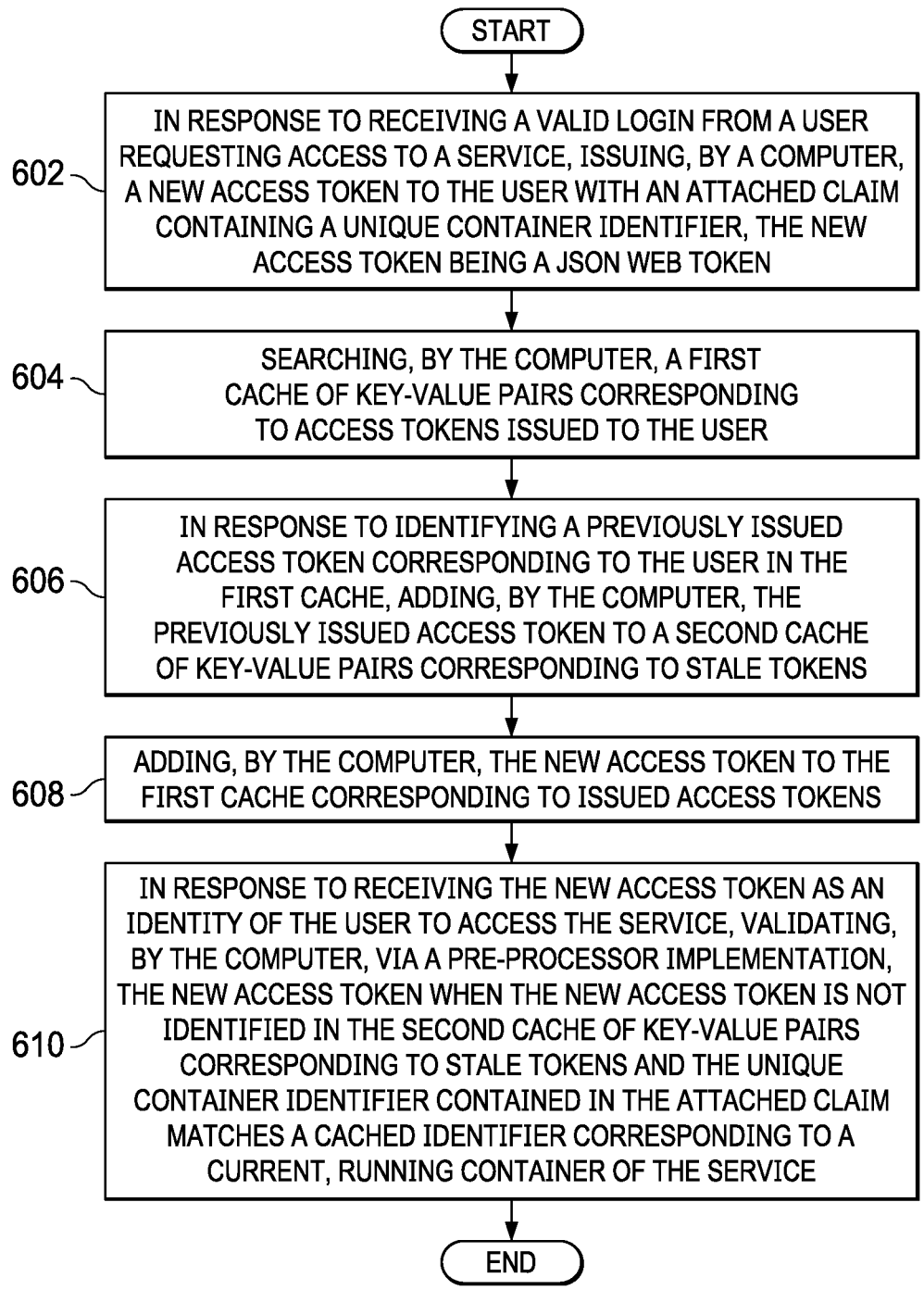
FIG. 6 is a flowchart illustrating a process for determining access to a requested service using an access token in accordance with an illustrative embodiment.

With reference now to FIG. 6, a flowchart illustrating a process for determining access to a requested service using an access token is depicted in accordance with an illustrative embodiment. The process shown in FIG. 6 may be implemented in a computer, such as, for example, authorization server 106 in FIG. 1 or data processing system 200 in FIG. 2. For example, the process shown in FIG. 6 may be implemented in access token validator 218 in FIG. 2.

The process begins when the computer, in response to receiving a valid login from a user requesting access to a service, issues a new access token to the user with an attached claim containing a unique container identifier (step 602). The new access token is a JSON Web Token. The computer searches a first cache of key-value pairs corresponding to access tokens issued to the user (step 604).

The computer, in response to identifying a previously issued access token corresponding to the user in the first cache, adds the previously issued access token to a second cache of key-value pairs corresponding to stale tokens (step 606). In addition, the computer adds the new access token to the first cache corresponding to issued access tokens (step 608).

The computer, in response to receiving the new access token as an identity of the user to access the service, validates, via a pre-processor implementation, the new access token when the new access token is not identified in the second cache of key-value pairs corresponding to stale tokens and the unique container identifier contained in the attached claim matches a cached identifier corresponding to a current, running container of the service (step 610). Thereafter, the process terminates.

Thus, illustrative embodiments of the present invention provide a computer-implemented method, computer system, and computer program product for validating a presented access token to access a requested service in a Kubernetes environment based on the presented access token being a new access token (i.e., not a stale previously issued access token) corresponding to a user and the presented access token contains a correct unique container identifier corresponding to a current, running Kubernetes container instance of the requested service in the Kubernetes environment. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for handling access token invalidation in a singleton process, the computer-implemented method comprising:
   responsive to receiving a valid login from a user requesting access to a service, issuing a new access token to the user with an attached claim containing a unique container identifier;
   searching a first cache of key-value pairs corresponding to access tokens issued to the user;
   responsive to identifying a previously issued access token corresponding to the user in the first cache, adding the previously issued access token to a second cache of key-value pairs corresponding to stale tokens;
   adding the new access token to the first cache corresponding to issued access tokens; and
   responsive to receiving the new access token as an identity of the user to access the service, validating the new access token when the new access token is not identified in the second cache of key-value pairs corresponding to stale tokens and the unique container identifier contained in the attached claim matches a cached identifier corresponding to a current, running container of the service.

2. The computer-implemented method of claim 1 further comprising:
   receiving a login request to access the service using credentials of the user from a client device corresponding to the user via a network;
   authenticating the user based on validation of the credentials of the user;
   determining whether an issued access token cache includes one or more previously issued access tokens corresponding to the user; and
   responsive to determining that the issued access token cache does include one or more previously issued access tokens corresponding to the user, adding the one or more previously issued access tokens corresponding to the user included in the issued access token cache to a stale access token cache.

3. The computer-implemented method of claim 2 further comprising:
generating the new access token for the user having the attached claim that includes a user identifier corresponding to the user and a container identifier corresponding to the current, running container of the service;
adding the new access token corresponding to the user to the issued access token cache; and
sending the new access token with the attached claim that includes the user identifier and the container identifier to the client device of the user via the network.

4. The computer-implemented method of claim 1 further comprising:
receiving an access request to access the service using an access token with a claim that includes a container identifier from a client device via a network;
determining whether a stale access token cache includes the access token; and
responsive to determining that the stale access token cache does include the access token, determining that the access token is compromised and rejecting the access request.

5. The computer-implemented method of claim 4 further comprising:
responsive to determining that the stale access token cache does not include the access token, determining whether the container identifier included in the claim of the access token matches an identifier of the current, running container of the service; and
responsive to determining that the container identifier included in the claim of the access token does not match the identifier of the current, running container of the service, determining that the access token is compromised and rejecting the access request.

6. The computer-implemented method of claim 5 further comprising:
responsive to determining that the container identifier included in the claim of the access token does match the identifier of the current, running container of the service, determining whether the access token is valid per standard access token specifications; and
responsive to determining that the access token is invalid per standard access token specifications, determining that the access token is compromised and rejecting the access request.

7. The computer-implemented method of claim 6 further comprising:
responsive to determining that the access token is valid per standard access token specifications, allowing the access request.

8. The computer-implemented method of claim 1, wherein the current, running container of the service is a current, running Kubernetes container instance of the service in a Kubernetes environment.

9. The computer-implemented method of claim 1, wherein the new access token is a JSON Web Token.

10. The computer-implemented method of claim 1, wherein the validating of the new access token is performed via a pre-processing implementation, and wherein the pre-processing implementation is a Container Request Filter implementation.

11. A computer system for handling access token invalidation in a singleton process, the computer system comprising:
a bus system;
a storage device connected to the bus system, wherein the storage device stores program instructions; and
a processor connected to the bus system, wherein the processor executes the program instructions to:
issue a new access token to a user with an attached claim containing a unique container identifier in response to receiving a valid login from the user requesting access to a service;
search a first cache of key-value pairs corresponding to access tokens issued to the user;
add a previously issued access token to a second cache of key-value pairs corresponding to stale tokens in response to identifying the previously issued access token corresponding to the user in the first cache;
add the new access token to the first cache corresponding to issued access tokens; and
validate the new access token when the new access token is not identified in the second cache of key-value pairs corresponding to stale tokens and the unique container identifier contained in the attached claim matches a cached identifier corresponding to a current, running container of the service in response to receiving the new access token as an identity of the user to access the service.

12. The computer system of claim 11, wherein the processor further executes the program instructions to:
receive a login request to access the service using credentials of the user from a client device corresponding to the user via a network;
authenticate the user based on validation of the credentials of the user;
determine whether an issued access token cache includes one or more previously issued access tokens corresponding to the user; and
add the one or more previously issued access tokens corresponding to the user included in the issued access token cache to a stale access token cache in response to determining that the issued access token cache does include one or more previously issued access tokens corresponding to the user.

13. The computer system of claim 12, wherein the processor further executes the program instructions to:
generate the new access token for the user having the attached claim that includes a user identifier corresponding to the user and a container identifier corresponding to the current, running container of the service;
add the new access token corresponding to the user to the issued access token cache; and
send the new access token with the attached claim that includes the user identifier and the container identifier to the client device of the user via the network.

14. A computer program product for handling access token invalidation in a singleton process, the computer program product comprising a computer-readable storage medium having program instructions embodied therewith, the program instructions executable by a computer to cause the computer to perform a method of:
responsive to receiving a valid login from a user requesting access to a service, issuing a new access token to the user with an attached claim containing a unique container identifier;
searching a first cache of key-value pairs corresponding to access tokens issued to the user;
responsive to identifying a previously issued access token corresponding to the user in the first cache, adding the previously issued access token to a second cache of key-value pairs corresponding to stale tokens;

adding the new access token to the first cache corresponding to issued access tokens; and responsive to receiving the new access token as an identity of the user to access the service, validating the new access token when the new access token is not identified in the second cache of key-value pairs corresponding to stale tokens and the unique container identifier contained in the attached claim matches a cached identifier corresponding to a current, running container of the service.

15. The computer program product of claim 14 further comprising:

receiving a login request to access the service using credentials of the user from a client device corresponding to the user via a network;

authenticating the user based on validation of the credentials of the user;

determining whether an issued access token cache includes one or more previously issued access tokens corresponding to the user; and responsive to determining that the issued access token cache does include one or more previously issued access tokens corresponding to the user, adding the one or more previously issued access tokens corresponding to the user included in the issued access token cache to a stale access token cache.

16. The computer program product of claim 15 further comprising:

generating the new access token for the user having the attached claim that includes a user identifier corresponding to the user and a container identifier corresponding to the current, running container of the service;

adding the new access token corresponding to the user to the issued access token cache; and sending the new access token with the attached claim that includes the user identifier and the container identifier to the client device of the user via the network.

17. The computer program product of claim 14 further comprising:

receiving an access request to access the service using an access token with a claim that includes a container identifier from a client device via a network;

determining whether a stale access token cache includes the access token; and responsive to determining that the stale access token cache does include the access token, determining that the access token is compromised and rejecting the access request.

18. The computer program product of claim 17 further comprising:

responsive to determining that the stale access token cache does not include the access token, determining whether the container identifier included in the claim of the access token matches an identifier of the current, running container of the service; and responsive to determining that the container identifier included in the claim of the access token does not match the identifier of the current, running container of the service, determining that the access token is compromised and rejecting the access request.

19. The computer program product of claim 18 further comprising:

responsive to determining that the container identifier included in the claim of the access token does match the identifier of the current, running container of the service, determining whether the access token is valid per standard access token specifications; and responsive to determining that the access token is invalid per standard access token specifications, determining that the access token is compromised and rejecting the access request.

20. The computer program product of claim 19 further comprising:

responsive to determining that the access token is valid per standard access token specifications, allowing the access request.

\* \* \* \* \*